(12) United States Patent
Diedrich et al.

(10) Patent No.: US 7,606,906 B2
(45) Date of Patent: Oct. 20, 2009

(54) BUNDLING AND SENDING WORK UNITS TO A SERVER BASED ON A WEIGHTED COST

(75) Inventors: Richard Alan Diedrich, Rochester, MN (US); Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 11/262,129

(22) Filed: Oct. 28, 2005

(65) Prior Publication Data

US 2007/0118652 A1    May 24, 2007

(51) Int. Cl.
*G06F 15/173* (2006.01)
*G06F 15/177* (2006.01)

(52) U.S. Cl. .................. 709/226; 709/220; 709/225; 709/238; 709/239; 709/240; 709/241; 709/242

(58) Field of Classification Search ............... 709/226, 709/220, 238, 239, 240, 241, 242, 225
See application file for complete search history.

(56) References Cited

U.S. PATENT DOCUMENTS

| | | | |
|---|---|---|---|
| 6,192,401 B1 * | 2/2001 | Modiri et al. ............. | 709/220 |
| 6,615,253 B1 * | 9/2003 | Bowman-Amuah ......... | 709/219 |
| 6,862,731 B1 * | 3/2005 | Roth et al. ............... | 718/100 |
| 7,131,015 B2 * | 10/2006 | Flautner et al. .......... | 713/320 |
| 2002/0007394 A1 * | 1/2002 | Bertolus et al. .......... | 709/204 |
| 2004/0030768 A1 * | 2/2004 | Krishnamoorthy et al. .. | 709/223 |
| 2004/0148336 A1 * | 7/2004 | Hubbard et al. .......... | 709/202 |

(Continued)

OTHER PUBLICATIONS

"Why PL/SQL?" Published Aug. 2004 by The University of Texas at Arlington.*

(Continued)

*Primary Examiner*—Philip C Lee
(74) *Attorney, Agent, or Firm*—Owen J. Gamon

(57) ABSTRACT

A method, apparatus, system, and signal-bearing medium that, in an embodiment, accumulate multiple work units into a bundle and send the bundle to a selected active server. The active server is selected based on the relative costs for the work units and costs for servers. In an embodiment, selecting the active server includes determining relative work unit costs and relative server costs, calculating total weighted costs for the servers based on the relative work unit costs and the relative server costs, and selecting the active server that has the lowest total weighted cost. The active server may either process a work in the bundle locally or send the work unit to a passive server for processing. The active server determines whether each work unit can be executed at the active server. If the work unit can be executed on the active server, the active server executes the work unit and creates local results. If the work unit cannot be executed on the server, the active server sends the work unit to a passive server, and the passive server creates remote results. The active server receives the remote results from the passive server, combines the local results with the remote results into combined results, and sends the combined results to a client. In various embodiments, branch and dependency data are included in the bundle, which the active server uses to order and conditionally process for the work units.

17 Claims, 7 Drawing Sheets

U.S. PATENT DOCUMENTS

2005/0114429 A1* 5/2005 Caccavale .................. 709/200

OTHER PUBLICATIONS

"Oracle™ Database Administrator's Guide 10g Release 1(10.1)." Published Dec. 2003 by Oracle Corp.*

"Oracle™ Database Advanced Replication 10g Release 1 (10.1)." Published Dec. 2003 by Oracle Corp.*

Chi-Hung Chi, et al., Proxy-Cache Aware Object Bundling for Web Access Acceleration, National University of Singapore.

Bonatti, P A et al, "On Optimal Service Selection", Proceedings of the 14th International Conference on World Wide Web, pp. 530-538.

Tang, Jing-fan et al, "Dynamic Economic and QoS-based Approach for Workflow-Oriented Distributed Services Allocation", IEEE International Conference on Systems, Man and Cybernetics, 2004, vol. 4, pp. 3349-3353.

* cited by examiner

WORK UNIT RELATIVE COST DATA 164

| WORK UNIT 330 | RELATIVE COST 335 | |
|---|---|---|
| RETRIEVE | 2 | 305 |
| UPDATE | 4 | 310 |
| DELETE | 3 | 315 |
| BUY | 5 | 320 |
| SELL | 6 | 325 |

FIG. 3A

SERVER COST DATA 165

| SERVER ID 365 | SERVER COST 370 | |
|---|---|---|
| SERVER A | 2 | 350 |
| SERVER B | 4 | 355 |
| SERVER C | 3 | 360 |

FIG. 3B

INVOCATION STREAM 166

| ID (430) | OBJECT (435) | METHOD (440) | PARMS (450) | BRANCHES (455) | DEPENDENCY (460) | ACTIVE SERVER (470) | |
|---|---|---|---|---|---|---|---|
| A | TABLE X | RETRIEVE | KEY L | IF A SUCCEEDS THEN B ELSE C | | SERVER A | 405 |
| B | TABLE X | UPDATE | KEY M | | | SERVER A | 410 |
| C | TABLE Y | DELETE | KEY N | | | SERVER A | 415 |
| D | TABLE Y | BUY | RED SHIRT | | | SERVER A | 420 |
| E | TABLE Z | SELL | 100 SHARES | | A, D | SERVER A | 425 |

BUNDLING AND SENDING WORK UNITS TO A SERVER BASED ON A WEIGHTED COST

FIELD

This invention generally relates to computer systems and more specifically relates to bundling and sending work units to a server based on a weighted cost.

BACKGROUND

The development of the EDVAC (Electronic Discrete Variable Automatic Computer) computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Years ago, computers were stand-alone devices that did not communicate with each other, but today, computers are increasingly connected in networks and one computer, called a client, may request another computer, called a server, to perform an operation. With the advent of the Internet, this client/server model is increasingly being used in online businesses and services, such as online auction houses, stock trading, banking, commerce, and information storage and retrieval.

Two current techniques for connecting clients and servers are called a Service Oriented Architecture (SOA) and Utility Computing. A service-oriented architecture includes a collection of services, which communicate with each other. A service is a function that is well-defined, self-contained, and does not depend on the context or state of other services. The communication between the services may involve either simple data passing or may involve two or more services coordinating some activity. Utility computing is a service provisioning model in which a service provider makes computing resources available to a customer as needed, and charges customers for a specific usage of the resource rather than a flat rate. Like other types of on-demand computing (such as grid computing), the utility model seeks to maximize the efficient use of resources and/or minimize associated costs. Another version of utility computing is carried out within an enterprise in a shared pool utility model. In the shared pool utility model, an enterprise centralizes its computing resources to serve a larger number of users without unnecessary redundancy.

In both the Service Oriented Architecture and Utility Computing, the client determines the server that is to receive and process a request, and the client may have multiple requests that it sends to multiple servers. Each server processes its received requests and sends responses to the client that originated the request. With this multiplicity of requests and responses comes a large amount of network traffic, which slows the performance of the network and thus increases the response time of the requests.

Hence, what is needed is a better technique for communicating requests and responses between clients and servers.

SUMMARY

A method, apparatus, system, and signal-bearing medium are provided that, in an embodiment, accumulate multiple work units into a bundle and send the bundle to a selected active server. The active server is selected based on the relative costs for the work units and costs for servers. In an embodiment, selecting the active server includes determining relative work unit costs and relative server costs, calculating total weighted costs for the servers based on the relative work unit costs and the relative server costs, and selecting the active server that has the lowest total weighted cost. The active server may either process a work in the bundle locally or send the work unit to a passive server for processing. The active server determines whether each work unit can be executed at the active server. If the work unit can be executed on the active server, the active server executes the work unit and creates local results. If the work unit cannot be executed on the server, the active server sends the work unit to a passive server, and the passive server creates remote results. The active server receives the remote results from the passive server, combines the local results with the remote results into combined results, and sends the combined results to a client. In various embodiments, branch and dependency data are included in the bundle, which the active server uses to order and conditionally process for the work units.

BRIEF DESCRIPTION OF THE DRAWINGS

Various embodiments of the present invention are hereinafter described in conjunction with the appended drawings:

FIG. 3A depicts a block diagram of an example data structure for work unit relative cost data, according to an embodiment of the invention.

FIG. 3B depicts a block diagram of an example data structure for server cost data, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
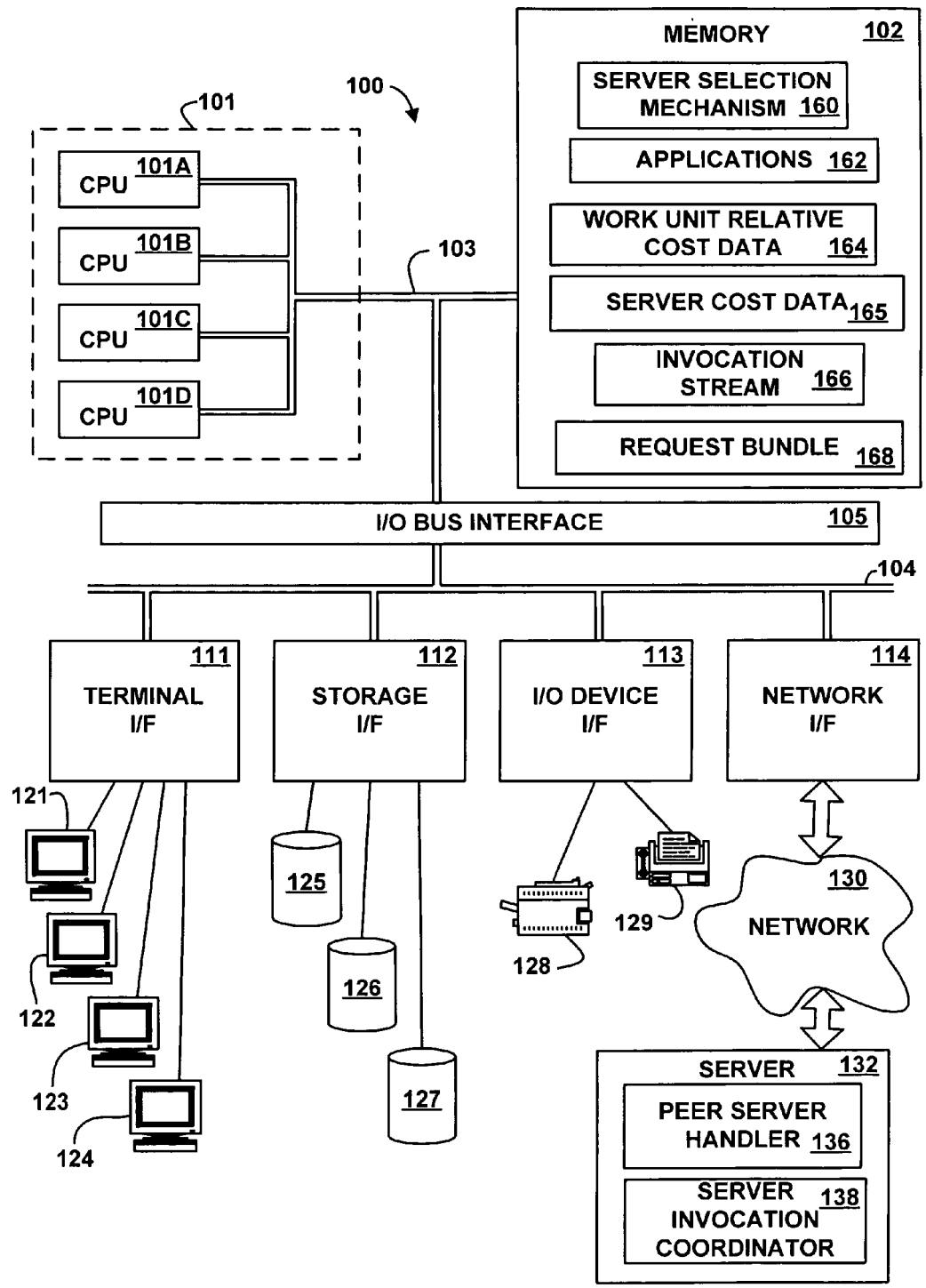
FIG. 1 depicts a high-level block diagram of an example system for implementing an embodiment of the invention.

Referring to the Drawings, wherein like numbers denote like parts throughout the several views, FIG. 1 depicts a high-level block diagram representation of a client computer system 100 connected via a network 130 to a server 132, according to an embodiment of the present invention. In an embodiment, the hardware components of the client computer system 100 may be implemented by an ESERVER ISERIES computer system available from INTERNATIONAL BUSINESS MACHINES Corporation of Armonk, N.Y. However, those skilled in the art will appreciate that the mechanisms and apparatus of embodiments of the present invention apply equally to any appropriate computing system. The computer system 100 acts as a client for the server 132, but the terms "client" and "server" are used for convenience only, and in other embodiments an electronic device that is used as a server in one scenario may be used as a client in another scenario, and vice versa.

The major components of the client computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The client computer system 100 contains one or more general-purpose programmable central processing units (CPUs) 101A, 101B, 101C, and 101D, herein generically referred to as the processor 101. In an embodiment, the client computer system 100 contains multiple processors typical of a relatively large system; however, in another embodiment the client computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the client computer system 100, and may also include the virtual memory of other computer systems coupled to the client computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes a server selection mechanism 160, applications 162, work unit relative cost data 164, server cost data 165, an invocation stream 166, and a request bundle 168. Although the server selection mechanism 160, the applications 162, the work unit relative cost data 164, the server cost data 165, the invocation stream 166, and the request bundle 168 are illustrated as being contained within the memory 102 in the client computer system 100, in other embodiments some or all of them may be on different computer systems and may be accessed remotely, e.g., via the network 130. The client computer system 100 may use virtual addressing mechanisms that allow the programs of the client computer system 100 to behave as if they only have access to a large, single storage entity instead of access to multiple, smaller storage entities. Thus, while the server selection mechanism 160, the applications 162, the work unit relative cost data 164, the server cost data 165, the invocation stream 166, and the request bundle 168 are illustrated as being contained within the main memory 102, these elements are not necessarily all completely contained in the same storage device at the same time. Further, although the server selection mechanism 160, the applications 162, the work unit relative cost data 164, the server cost data 165, the invocation stream 166, and the request bundle 168 are illustrated as being separate entities, in other embodiments some of them, or portions of some of them, may be packaged together.

In an embodiment, the server selection mechanism 160 includes instructions capable of executing on the processor 101 or statements capable of being interpreted by instructions executing on the processor 101 to perform the functions as further described below with reference to FIGS. 2 and 5. In another embodiment, the server selection mechanism 160 may be implemented in microcode. In another embodiment, the server selection mechanism 160 may be implemented in hardware via logic gates and/or other appropriate hardware techniques in lieu of or in addition to a processor-based system. The applications 162 may be user applications, third party applications, an operating system, or any combination or portion thereof. The work unit relative cost data 164 is further described below with reference to FIG. 3A. The server cost data 165 is further described below with reference to FIG. 3B. The invocation stream 166 is further described below with reference to FIG. 4A. The request bundle 168 is further described below with reference to FIG. 4B.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiments many other such devices may exist, which may be of differing types. The network interface 114 provides one or more communications paths from the client computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the client computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The client computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The client computer system 100 may alternatively be a single-user system, typically containing only a single user display and keyboard input, or might be a server or similar device which has little or no direct user interface, but receives requests from other computer systems (clients). In other embodiments, the client computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the client computer system 100. In various embodiments, the network 130 may represent a storage device or a combination of storage devices, either connected directly or indirectly to the client computer system 100. In an embodiment, the network 130 may support INFINIBAND architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The server 132 may include some or all of the hardware components already described for the client computer system 100. The server 132 further includes a peer server handler 136 and a server invocation coordinator 138. The server 132 is further described below with reference to FIG. 2.

In an embodiment, the peer server handler 136 and the server invocation coordinator 138, or any combination or portion thereof, include instructions capable of executing on a processor analogous to the processor 101 or statements capable of being interpreted by instructions executing on the processor to perform the functions as further described below with reference to FIGS. 2, 6, and 7. In another embodiment, the peer server handler 136 and the server invocation coordinator 138, or any combination or portion thereof, may be implemented in microcode. In another embodiment, the peer server handler 136 and the server invocation coordinator 138, or any combination or portion thereof, may be implemented in hardware via logic gates and/or other appropriate hardware techniques in lieu of or in addition to a processor-based system.

It should be understood that FIG. 1 is intended to depict the representative major components of the client computer system 100, the network 130, and the server 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the client computer system 100, and that, when read and executed by one or more processors 101 in the client computer system 100, cause the client computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be stored in, encoded on, and delivered to the client computer system 100 and/or the server 132 via a variety of tangible signal-bearing media, which include, but are not limited to the following computer-readable media:

(1) information permanently stored on a non-rewriteable storage medium, e.g., a read-only memory or storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmission medium, such as through a computer or a telephone network, e.g., the network 130.

Such tangible signal-bearing media, when carrying or encoded with computer-readable, processor-readable, or machine-readable instructions or statements that direct or control the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
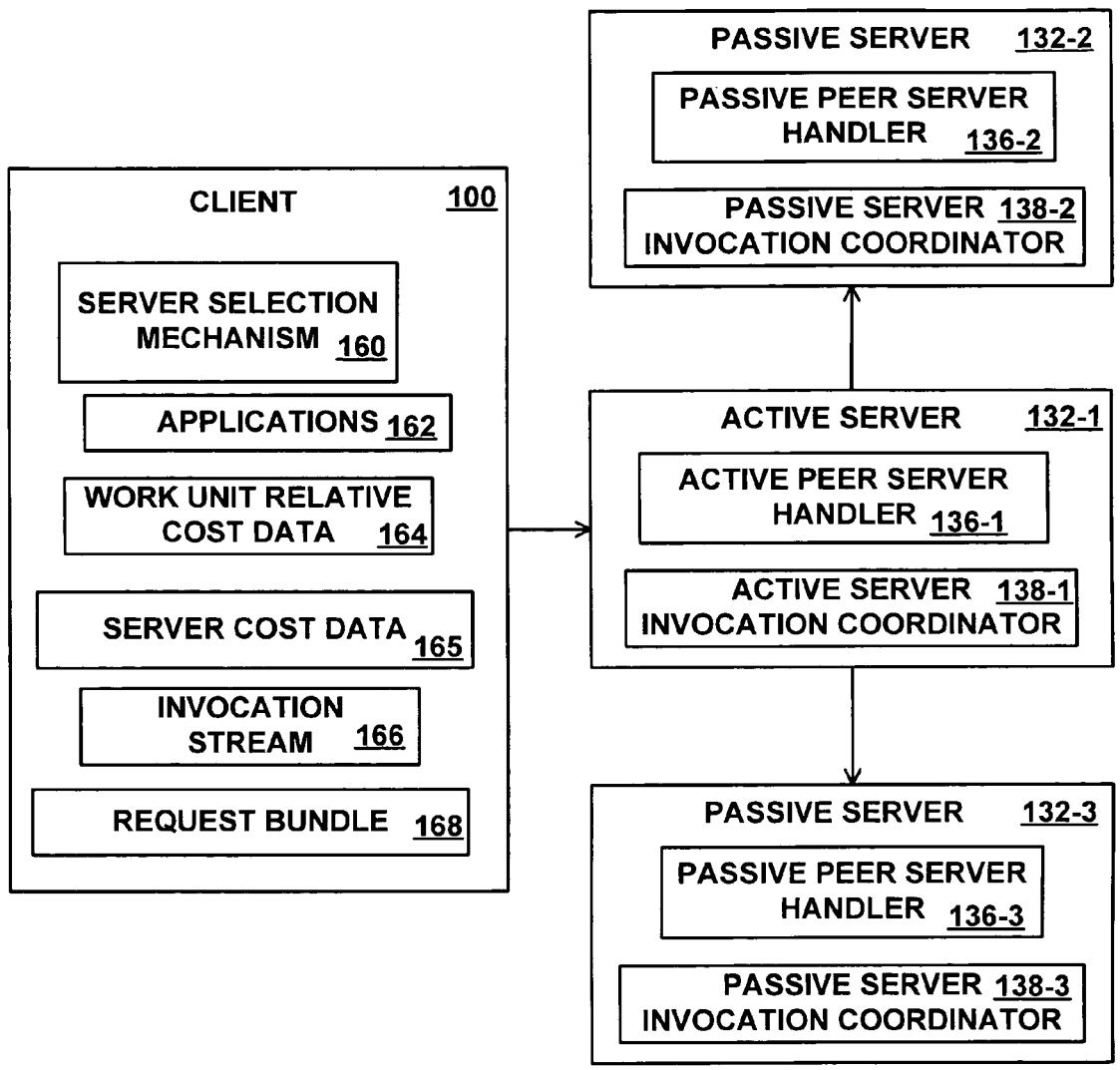
FIG. 2 depicts a block diagram of a selected components of the example system, according to an embodiment of the invention.

FIG. 2 depicts a block diagram of selected components of the example system of FIG. 1, according to an embodiment of the invention. Illustrated are the client 100 communicatively coupled to the active server 132-1 via the network 130 (FIG. 1). The active server 132-1 is communicatively coupled to the passive servers 132-2 and 132-3 via the network 130 (FIG. 1), but in other embodiments any numbers of clients, active servers, and passive servers may be present. The server 132 (FIG. 1) generically refers to the active server 132-1 and the passive servers 132-2 and 132-3.

The active server 132-1 includes the active peer server handler 136-1 and the active server invocation coordinator 138-1. The passive server 132-2 includes the passive peer server handler 136-2 and the passive server invocation coordinator 138-2. The passive server 132-3 includes the passive peer server handler 136-3 and the passive server invocation coordinator 138-3. The peer server handler 136 (FIG. 1) generically refers to the active peer server handler 136-1 and the passive peer server handlers 136-2 and 136-3. The server invocation coordinator 138 (FIG. 1) generically refers to the active server invocation coordinator 138-1 and the passive server invocation coordinator 138-2 and 138-3. The terms "active" and "passive" are used herein for convenience only, and in other embodiments, a server 132, a peer server handler 136, and a server invocation coordinator 138 that are "active" for one request bundle may be "passive" for another request bundle, and vice versa. Thus, for example, the server 132-1 may operate as an active server for one request bundle while simultaneously operating as a passive server for other request bundles. Similarly, for example, the server 132-2 may operate as a passive server for one request bundle while simultaneously operating as an active server for other request bundles.

The server selection mechanism 160 accumulates actions from the applications 162 until a boundary is reached. The boundary may be specified by transactions, by activities, or by a user. The server selection mechanism 160 creates work units based on the actions and bundles the work units into the request bundle 168 at the boundary. The server selection mechanism 160 further selects the active server 132-1, from among multiple servers 132, to receive the request bundle 168 via the work unit relative cost data 164 and the server cost data 165. The server selection mechanism 160 may select different active servers 132-1 for different request bundles 168. The server selection mechanism 160 determines the active server 132-1 based on the nature of the request bundles 168, the relative cost data 164 of the work units in the request bundle 168, and their average server cost data 165, in order to minimize the cost of processing the request bundle 168 at different servers 132. The server selection mechanism 160 sends the request bundle 168 to the active server invocation coordinator 138-1 at the selected active server 132-1.

The active server invocation coordinator 138-1 coordinates the work units in the request bundle 168. The active server invocation coordinator 138-1 determines whether the local active peer server handler 136-1 is capable of processing the work units in the request bundle 168. If the local active peer server handler 136-1 cannot process a work unit, the active server invocation coordinator 138-1 sends the work unit to the remote passive server 132-2 or 132-3 where the work unit is processed by the passive peer server handler 136-2 or 136-3. The active server invocation coordinator 138-1 checks dependencies between work units and branches for conditional processing of work units, in order to increase parallel computing of different work units in the request bundle 168. The active server invocation coordinator 138-1 waits for the results from all work units. When the results are received, the active server invocation coordinator 138-1 combines the results and sends the combined results to the client 100.

FIG. 3A depicts a block diagram of an example data structure for the work unit relative cost data 164, according to an embodiment of the invention. The work unit relative cost data 164 includes records 305, 310, 315, 320, and 325, but in other embodiments any number of records with any appropriate data may be present. Each of the records 305, 310, 315, 320, and 325 includes a work unit field 330 and a relative cost field 335, but in other embodiments more or fewer fields may be present.

The work unit field 330 identifies a transaction, a calculation, an operation, a function, a request, a command, or any other type of work unit that is capable of being performed or executed. The relative cost field 335 identifies a relative cost of performing or executing the respective work unit 330 when compared to other work units, regardless of which server 132 at which the work unit is executed or performed. As examples of a work unit's relative cost, work units that implement a retrieve action may have a lower relative cost than work units that implement an update action, and work units that implement a browse action may have a lower relative cost than work units that implement a transaction action, regardless of which server processes the work units that result from the actions. But, in other embodiments any appropriate actions, work units, and relative costs may be used.

FIG. 3B depicts a block diagram of an example data structure for the server cost data 165, according to an embodiment of the invention. The server cost data 165 includes records 350, 355, and 360, but in other embodiments, any number of records with any appropriate data may be present. Each of the records 350, 355, and 360 includes a server identification field 365 and a server cost field 370, but in other embodiments more or fewer fields may be present. The server identification field 365 identifies the servers 132. The server cost 370 indicates a relative or absolute cost of processing work units at the server 365. In an embodiment, the server cost 370 indicates the cost associated with a particular server 365, regardless of which work unit 330 the server 365 performs or executes. In another embodiment, the server cost 370 is dependent on which work unit 330 the server 365 is processing, so the server cost 370 may vary for the server 365 depending on whether the server 365 can process the work unit 330 itself or must forward the work unit 330 to a passive server 132-2 or 132-3.

As examples of a server cost 370, different servers 132 identified by different server identifiers 365 may have different costs depending on the type of the server 132, the country in which the server 132 is located, the workload of the server 132, the purchase price or operating costs of the server 132, the services that the local peer server handler 136 is capable of performing, or any other appropriate factors. In various embodiments, the servers 132 may determine their costs via training based on historical data, by calculations based on rules, or may have their costs set by administrators.

Figures 4A, 4B:
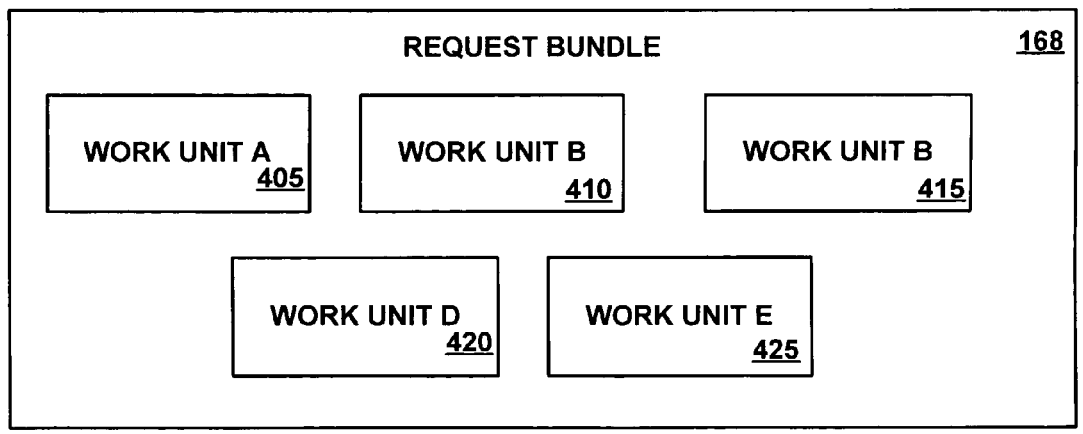
FIG. 4A depicts a block diagram of an example data structure for an invocation stream, according to an embodiment of the invention.
FIG. 4B depicts a block diagram of an example data structure for a request bundle, according to an embodiment of the invention.

FIG. 4A depicts a block diagram of an example data structure for the invocation stream 166, according to an embodiment of the invention. The invocation stream 166 includes work units 405, 410, 415, 420, and 425, but in other embodiments any number of work units with any appropriate data may be present. Each of the work units 405, 410, 415, 420, and 425 includes an identifier field 430, an object field 435, a method field 440, a parameters field 450, a branches field 455, a dependency field 460, and an active server identification field 470.

The identifier field 430 identifies the work unit and the record in the invocation stream 166. The object 435 identifies the target to which the work unit is directed, or the data or device the work unit needs to access. Examples of the object 435 include a database, a database table, a document, a file, an electronic device, a storage device, an I/O processor, a network interface device, or any other appropriate type of object to which the method 440 is directed. The method 440 identifies the method, function, procedure, module, or any other logic that the peer server handler 136 uses to perform or execute the work unit. The parameters 450 identify any data that may be passed to the method 440 by the action received from the application 162. Examples of the parameters 450 may include keys, columns, row identifiers, account numbers, passwords, items, or any other appropriate data needed by the method to perform or execute the work unit.

The branches 455 identify logic conditions that specify the order and conditional execution of the work units. For example, the work unit 405 has a branch 455, indicating that if the work unit A 405 (identified by the ID 430 of "A") is successful, then the work unit B 410 (identified by the ID 430 of "B") is to be performed or executed, but if the work unit A 405 is not successful, then the work unit C 415 (identified by the ID 430 of "C") is to be performed or executed. The active server invocation coordinator 138-1 at the active server 132-1 specified by the active server field 470 reads the branches 455 and conditionally orders the execution of the specified work units based on the logic of the branches 455, as further described below with reference to FIG. 6.

The dependency field 460 identifies dependencies between the work units that affect the order of processing or executing of the work units or affect possible parallel processing of the work units. For example, the work unit 425 has a dependency field 460, indicating that the results of work units "A" and "D" (e.g., data retrieved by the work units "A" and "D") are to be used by work unit "E." Hence, the active server invocation coordinator 138-1 does not send the work unit "E" to the appropriate peer server handler 136 until work units "A" and "D" have completed. But, the work units "A" and "D" may execute in any order, or simultaneously. The active server invocation coordinator 138-1 at the active server 132-1 specified by the active server field 470 reads the dependency 460 and orders the execution of the specified work units based on the dependency 460, as further described below with reference to FIG. 6.

The active server identification field 470 identifies the active server 132-1 to which the work unit may be sent. The server selection mechanism 160 selects the active server 132-1 and sets the active server identification field 470 accordingly, as further described below with reference to FIG. 5.

FIG. 4B depicts a block diagram of an example data structure for a request bundle 168, according to an embodiment of the invention. The example request bundle 168 includes any number of bundled work units that use the same active server 470 (FIG. 4A), such as the illustrated work units 405, 410, 415, 420, and 425. The server selection mechanism 160 selects the work units 405, 410, 415, 420, and 425 and bundles them into the request bundle 168, as further described below with reference to FIG. 5.

Figure 5:
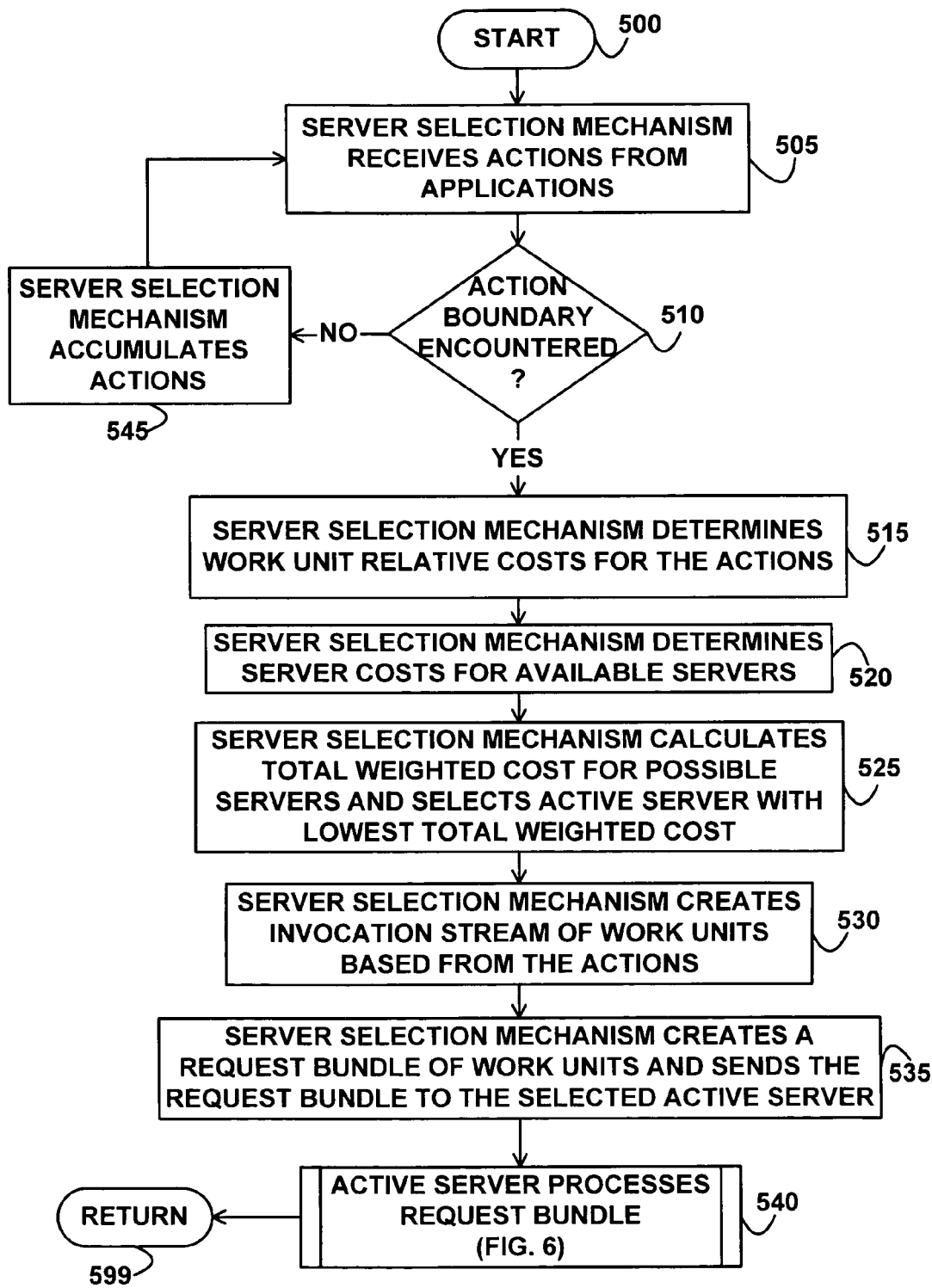
FIG. 5 depicts a flowchart of example processing for actions, according to an embodiment of the invention.

FIG. 5 depicts a flowchart of example processing for actions, according to an embodiment of the invention. Control begins at block 500. Control then continues to block 505 where the server selection mechanism 160 receives actions from the applications 162. Control then continues to block 510 where the server selection mechanism 160 determines whether an action boundary has been encountered. In various embodiments, the action boundary may be specified by transactions of the application 162, by activities of the application 162, or by a user.

If the determination at block 510 is true, then an action boundary has been encountered, so control continues to block 515 where the server selection mechanism 160 determines the relative costs 335 for the work units that result from the received accumulated actions. In an embodiment, the server selection mechanism 160 determines the relative costs by finding the work unit 330 in the work unit relative cost data 164 based on the received action and reading the associated relative cost 335. In another embodiment, the server selection mechanism 160 also adjusts the relative cost 335 based on any associated parameters received with the action from the application 162.

Control then continues to block 520 where the server selection mechanism 160 determines the server costs 370 for the servers 132 that are available to process the work units associated with the received and accumulated actions. In an embodiment, the costs for various available servers are fixed regardless of the work unit, and the server selection mechanism 160 reads the server costs 370 from the server cost data 165 based on the servers 365 that are available to process the work units.

In another embodiment, the server selection mechanism 160 adjusts the server costs 370 based on the work units. For example, if a server 365 has services available in its active peer server handler 136-1 that can process the work unit locally, then the server selection mechanism 160 uses the server cost 370 in the server cost data 165 without modification. But, if the server 365 must incur the further communication cost of sending or routing the work unit to a passive server (e.g., the passive server 132-2 or 132-3) for processing by the remote passive peer server handler (e.g., the passive peer server handler 136-2 or 136-3), then the server selection mechanism 160 increases the server cost 370 for the server 365 accordingly.

Control then continues to block 525 where the server selection mechanism 160 calculates the total weighted cost for each of the possible available servers 132 identified by the server identifier 365 for processing a request bundle 168 that includes the work units that result from the accumulated actions. Using the example of FIGS. 3A, 3B, and 4A, the work units A, B, C, D, and E in respective records 405, 410, 415, 420, and 425 have respective work unit relative costs of 2, 4, 3, 5, and 6. Three possible servers 132 exist: server A of record 350, server B of record 355, and server C of record 360 in the server cost data 165 with respective server costs 370 of 2, 4, and 3.

If server A is capable of processing work units A, B, and C itself, but needs to send or route work units D and E to server B, then the server selection mechanism 160 increases (at block 520) the server cost 370 for the work units D and E from 2 to, e.g., 4. Thus, server A has a total weighted cost of $(2*2)+(2*4)+(2*3)+(4*5)+(4*6)=62$.

If server B is capable of processing work units B, C, D, and E itself, but needs to send or route work unit A to server C, then the server selection mechanism 160 increases (at block 520) the server cost 370 for the work unit E from 4 to, e.g., 6. Thus, server B has a total weighted cost of $(6*2)+(4*4)+(4*3)+(4*5)+(4*6)=84$.

If server C is capable of processing work units A, B, D, and E itself, but needs to send or route work unit C to server A, then the server selection mechanism 160 increases (at block 520) the server cost 370 for the work unit C from 3 to 4, for example. Thus, server C has a total weighted cost of $(3*2)+(3*4)+(4*3)+(3*5)+(3*6)=63$.

The server selection mechanism 160 then compares the calculated total weighted costs for each of the servers (62 versus 84 versus 63) and selects the server A that has the lowest total weighted cost and designates that server as the active server 132-1.

Control then continues to block 530 where the server selection mechanism 160 creates the invocation stream 166 of the work units based on the accumulated actions and the active server previously determined at block 525, including creating the identifier 430, the object 435, the method 440, the parameters 450, the branches 455, the dependencies 460, and the active server 470. Control then continues to block 535 where the server selection mechanism 160 creates the request bundle 168 of the work units based on the invocation stream and sends the request bundle to the selected active server 470. Control then continues to block 540 where the active server 132-1 processes the request bundle 168, as further described below with reference to FIG. 6. Control then continues to bock 599 where the logic of FIG. 5 returns.

If the determination at block 510 is false, then an action boundary has not been encountered, so control continues to block 510 where the server selection mechanism 160 accumulates the received actions. Control then returns to block 505, as previously described above.

Figure 6:
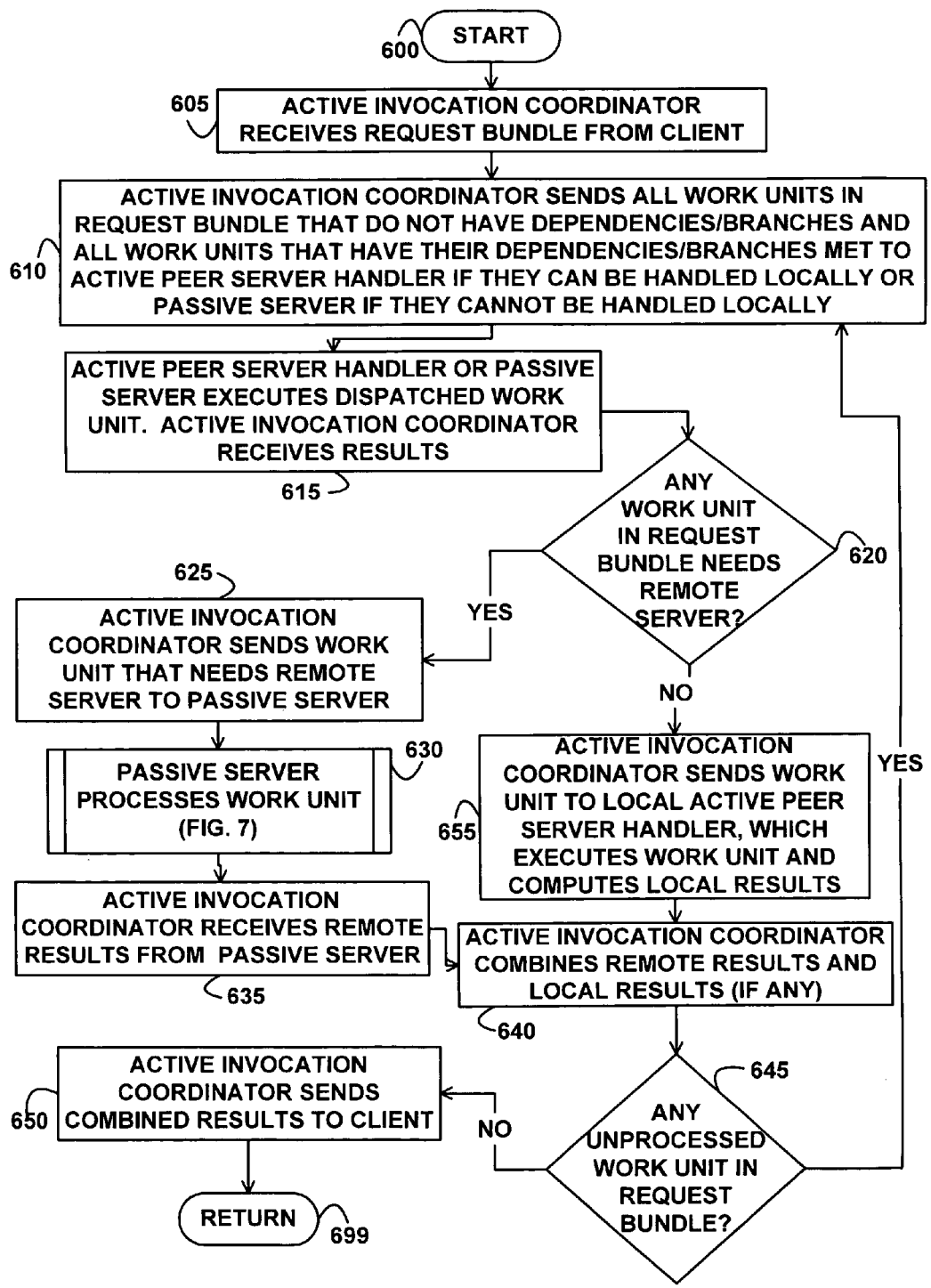
FIG. 6 depicts a flowchart of example processing for a request bundle at an active server, according to an embodiment of the invention.

FIG. 6 depicts a flowchart of example processing for a request bundle 168 at an active server 132-1, according to an embodiment of the invention. Control begins at block 600. Control then continues to block 605 where the active server invocation coordinator 138-1 receives the request bundle 168 from the client 100. Control then continues to block 610 where the active server invocation coordinator 138-1 determines the work units in the request bundle 168 that do not have branches 455 or dependencies 460. The active server invocation coordinator 138-1 further determines the work units in the request bundle 168 that have their branches 455 and dependencies 460 met.

A work unit has its branches 455 met if the associated logic condition is satisfied. Using the example of FIG. 4A, the active server invocation coordinator 138-1 determines if the work unit A has already executed and was successful. If the work unit A has executed and was successful, then the active server invocation coordinator 138-determines that the work unit B has its branches met and is available for execution. Similarly, if the work unit A has executed and was not successful, then the active server invocation coordinator 138-determines that the work unit C has its branches met and is available for execution.

A work unit has its dependencies 460 met if the associated work units specified in the dependency 460 have already executed, i.e., if the order of execution of the work units is satisfied. Using the example of record 425 in FIG. 4A, the active server invocation coordinator 138-1 determines whether the work units A and D have already executed. If the work units A and D have already executed, then the work unit E has its dependency 460 met because the work units on which the work unit E depends (A and D) have executed, and thus the order of execution specified in the dependency 460 is satisfied.

The active server invocation coordinator 138-1 then decides whether the determined work units can be handled locally by the active peer server handler 136-1. In an embodiment, the active server invocation coordinator 138-1 decides whether the determined work units can be handled locally based on whether the resources, services, or functions that are necessary to execute the determined work units are currently available at the active peer server handler 136-1.

If the determined work units can be handled locally, then the active server invocation coordinator 138-1 sends the determined work units to the active peer server handler 136-1. If the work units cannot be handled locally, then the active server invocation coordinator 138-1 sends the determined work units to the appropriate passive server 132-2 or 132-3 that is capable of handling the work units. In an embodiment, the active server invocation coordinator 138-1 selects the appropriate passive server 132-2 or 132-3 based on determining whether the resources, services, or functions that are necessary to execute the determined work units are currently available at the passive server 132-2 or 132-3.

Control then continues to block 615 where the active peer server handler 136-1 processes or executes any sent work units and creates or computes local results. The passive server 132-2 or 132-3 processes or executes any sent work units and creates or computes remote results (as further described below with reference to FIG. 7). The active server invocation coordinator 138-1 receives the local results and/or the remote results.

Control then continues to block 620 where the active server invocation coordinator 138-1 determines whether any work unit in the request bundle 168 that is still unprocessed needs a remote passive server 132-2 or 132-3. If the determination at block 620 is true, then an unprocessed work unit in the request bundle 168 cannot be processed locally and needs a remote passive server 132-2 or 132-3, so control continues to block 625 where the active server invocation coordinator 138-1 sends the work unit determined at block 620 to the appropriate passive server 132-2 or 132-3. Control then continues to block 630 where the passive server 132-2 or 132-3 processes the work unit, as further described below with reference to FIG. 7.

Control then continues to block 635 where the active server invocation coordinator 138-1 receives remote results from the passive server 132-2 or 132-3. Control then continues to block 640 where the active server invocation coordinator 138-1 combines the remote results with local results if any. Control then continues to block 645 where the active server invocation coordinator 138-1 determines whether any work unit in the request bundle 138 is still unprocessed.

If the determination at block 645 is true, then at least one unprocessed work unit still exists in the request bundle 168, so control returns to block 610, as previously described above.

If the determination at block 645 is false, then all work units in the request bundle 168 have been processed, so control continues to block 650 where the active server invocation coordinator 138-1 sends the combined results of the work units to the client 100. Control then continues to block 699 where the logic of FIG. 6 returns.

If the determination at block 620 is false, than any unprocessed work unit in the request bundle 168 does not need a remote passive server 132-2 or 132-3, so control continues to block 655 where the active server invocation coordinator 138-1 sends the work unit determined at block 620 to the local active peer server handler 136-1, which processes the work unit and returns local results. Control then continues to block 640 where the active server invocation coordinator 138-1 combines the local results with remote results if any. Control then continues to block 645, as previously described above.

Figure 7:
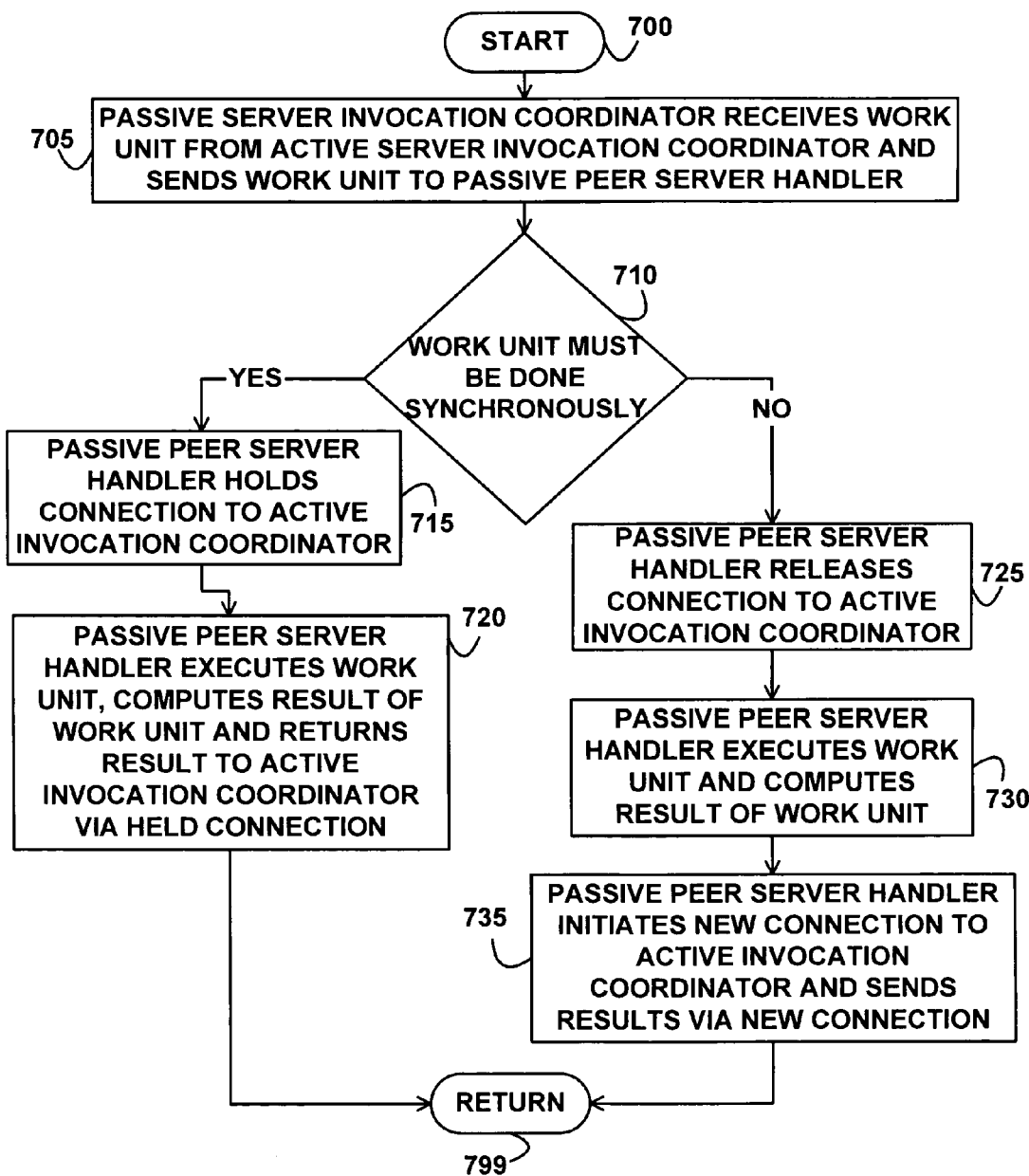
FIG. 7 depicts a flowchart of example processing for a work unit at a passive server, according to an embodiment of the invention.

FIG. 7 depicts a flowchart of example processing for a work unit at a passive server 132-2 or 132-3, according to an embodiment of the invention. Control begins at block 700. Control then continues to block 705 where the passive server invocation coordinator 138-2 or 138-3 receives a work unit from the active server invocation coordinator 138-1 and sends the work unit to its local passive peer server handler 136-2 or 136-3. Control then continues to the block 710 where the passive peer server handler 136-2 or 136-3 determines whether the work unit must be performed or executed synchronously. If the determination at block 710 is true, then the work unit must be performed or executed synchronously, so control continues to block 715 where the passive peer server handler 136-2 or 136-3 holds the connection to the active server invocation coordinator 138-1. Control then continues to block 720 where the passive peer server handler 136-2 or 136-3 executes the work unit or computes the result of the work unit and returns to the result to the active server invocation coordinator 138-1 via the held connection. Control then continues to block 799 where the logic of FIG. 7 returns.

If the determination at block 710 is false, then the work unit does not need to be performed or executed synchronously, so control continues to block 725 where the passive peer server handler 136-2 or 136-3 releases the connection to the active server invocation coordinator 138-1. Control then continues to block 730 where the passive peer server handler 136-2 or 136-3 executes the work unit and computes the results of the work unit. Control then continues to block 735 where the passive peer server handler 136-2 or 136-3 initiates a new connection to the active server invocation coordinator 138-1 and sends the computed results via the new connection. Control then continues to block 799 where the logic of FIG. 7 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of records, entries, or organizations of data may be used. In addition, any data may be combined with logic, so that a separate data structure is not necessary. The previous detailed description is, therefore, not to be taken in a limiting sense, and the scope of the, present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
creating a bundle of a plurality of work units;
selecting an active server from among a plurality of servers, wherein the selecting further comprises determining a plurality of relative work unit costs for the plurality of work units, determining a plurality of relative server costs for the plurality of servers, calculating a plurality of total weighted costs for the plurality of servers based on the relative work unit costs and the relative server costs, and selecting the active server with a lowest of the total weighted costs; and
sending the bundle from a client to the active server, wherein the active server determines whether each of the work units can be executed at the active server,
if the work unit can be executed on the active server, the active server executes the work unit and creates local results,
if the work unit cannot be executed on the active server, the active server sends the work unit to a passive server, wherein weighted cost for the passive server is included in the total weighted cost for the active server, and wherein the passive server creates remote results, and
wherein the active server receives the remote results from the passive server, combines the local results with the remote results into combined results, and sends the combined results to the client.

2. The method of claim 1, wherein the creating the bundle of work units further comprises:
creating dependencies between the work units.

3. The method of claim 2, wherein the creating the dependencies between the work units further comprises:
creating an order of execution of the work units.

4. The method of claim 1, wherein the creating the bundle of work units further comprises:
creating branches between the work units.

5. The method of claim 4, wherein the creating the branches between the work units further comprises:
creating a logic condition that specifies conditional execution of the work units.

6. The method of claim 1, where the active server executes the work units and sends the work units to the passive server in an order.

7. A storage medium encoded with instructions, wherein the instructions when executed comprise:
creating a bundle of a plurality of work units;
selecting an active server from among a plurality of servers, wherein the selecting further comprises determining a plurality of relative work unit costs for the plurality of work units, determining a plurality of relative server costs for the plurality of servers, calculating a plurality of total weighted costs for the plurality of servers based on the relative work unit costs and the relative server costs, and selecting the active server with a lowest of the total weighted costs; and
sending the bundle from a client to the active server, wherein the active server determines whether each of the work units can be executed at the active server,
if the work unit can be executed on the active server, the active server executes the work unit and creates local results,
if the work unit cannot be executed on the active server, the active server sends the work unit to a passive server, wherein weighted cost for the passive server is included in the total weighted cost for the active server, wherein the passive server creates remote results, and wherein the active server receives the remote results from the passive server, combines the local results with the remote results into combined results, and sends the combined results to the client.

8. The storage medium of claim 7, wherein the creating the bundle of work units further comprises:

creating dependencies between the work units.

9. The storage medium of claim 8, wherein the creating the dependencies between the work units further comprises:

creating an order of execution of the work units.

10. The storage medium of claim 7, wherein the creating the bundle of work units further comprises:

creating branches between the work units.

11. The storage medium of claim 10, wherein the creating the branches between the work units further comprises:

creating a logic condition that specifies conditional execution of the work units.

12. The storage medium of claim 11, where the active server executes the work units and sends the work units to the passive server based on the logic condition.

13. A method for configuring a computer, comprising:

configuring the computer to create a bundle of a plurality of work units;

configuring the computer to select an active server from among a plurality of servers, wherein the selecting further comprises determining a plurality of relative work unit costs for the plurality of work units, determining a plurality of relative server costs for the plurality of servers, calculating a plurality of total weighted costs for the plurality of servers based on the relative work unit costs and the relative server costs, and selecting the active server with a lowest of the total weighted costs; and configuring the computer to send the bundle from the computer to the active server, wherein the active server determines whether each of the work units can be executed at the active server, if the work unit can be executed on the active server, the active server executes the work unit and creates local results, if the work unit cannot be executed on the active server, the active server sends the work unit to a passive server, wherein weighted cost for the passive server is included in the total weighted cost for the active server, wherein the passive server creates remote results, and wherein the active server receives the remote results from the passive server, combines the local results with the remote results into combined results, and sends the combined results to the computer.

14. The method of claim 13, wherein the configuring the computer to create the bundle of work units further comprises:

configuring the computer to create an order of execution of the work units.

15. The method of claim 14, wherein the active server executes the work units and sends the work units to the passive server in the order of the execution.

16. The method of claim 13, wherein the configuring the computer to create the bundle of work units further comprises:

configuring the computer to create a logic condition that specifies conditional execution of the work units.

17. The method of claim 16, where the active server executes the work units and sends the work units to the passive server based on the logic condition.

* * * * *

UNITED STATES PATENT AND TRADEMARK OFFICE
CERTIFICATE OF CORRECTION

PATENT NO. : 7,606,906 B2
APPLICATION NO. : 11/262129
DATED : October 20, 2009
INVENTOR(S) : Diedrich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 920 days.

Signed and Sealed this

Fourteenth Day of December, 2010

David J. Kappos
*Director of the United States Patent and Trademark Office*